United States Patent
Panchapakesan

(10) Patent No.: US 9,940,333 B2
(45) Date of Patent: Apr. 10, 2018

(54) FILE FORMAT BUNDLING

(71) Applicant: AIRWATCH LLC, Atlanta, GA (US)

(72) Inventor: Ramani Panchapakesan, Bangalore (IN)

(73) Assignee: AirWatch LLC, Atlanta, GA (US)

( * ) Notice: Subject to any disclaimer, the term of this patent is extended or adjusted under 35 U.S.C. 154(b) by 308 days.

(21) Appl. No.: 14/742,724

(22) Filed: Jun. 18, 2015

(65) Prior Publication Data

US 2016/0283475 A1    Sep. 29, 2016

(30) Foreign Application Priority Data

Mar. 27, 2015   (IN) .......................... 1578/CHE/2015

(51) Int. Cl.
*G06F 17/30* (2006.01)
(52) U.S. Cl.
CPC .............................. *G06F 17/30094* (2013.01)
(58) Field of Classification Search
CPC combination set(s) only.
See application file for complete search history.

(56) References Cited

U.S. PATENT DOCUMENTS

| | | | | |
|---|---|---|---|---|
| 2005/0289655 | A1* | 12/2005 | Tidwell | G06F 21/6209 726/27 |
| 2010/0114921 | A1* | 5/2010 | Bocharov | H04L 29/06027 707/758 |
| 2012/0079537 | A1* | 3/2012 | Kalidindi, Sr. | H04N 21/2225 725/40 |
| 2012/0233522 | A1* | 9/2012 | Barton | H04L 67/06 714/758 |

* cited by examiner

*Primary Examiner* — Etienne Leroux
(74) *Attorney, Agent, or Firm* — Thomas | Horstemeyer, LLP

(57) ABSTRACT

Various systems described herein facilitate storage of files in various formats. A client device can generate a request for a particular file or content. The client device can submit a request with various request parameters. A file service can identify an appropriate file in an appropriate format. The appropriate file in the appropriate format can be provided to the client device in response to the request.

16 Claims, 5 Drawing Sheets

FILE FORMAT BUNDLING

RELATED APPLICATIONS

Benefit is claimed under 35 U.S.C. 119(a)-(d) to Foreign application Serial No. 1578/CHE/2015 filed in India entitled "FILE FORMAT BUNDLING", on Mar. 27, 2015, by AIRWATCH LLC, which is herein incorporated in its entirety by reference for all purposes.

BACKGROUND

Some data storage providers operate data centers that allocate data for several users. A user can store and retrieve files, such as images, videos, and word processing documents, using one or more client devices that communicate with a data storage system over a network. The files can be stored in various formats that are compatible with various types of devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to storing and retrieving encrypted versions of files using data storage systems that are accessible to client devices over a network. In one example, a file can be stored in a content repository or any other type of file data store. The file can be stored in a storage account associated with the user or a group of users. In some cases, the file may be incompatible with viewer applications or properties of a device from which other users or the same user can subsequently access the file. Additionally, the file can also be associated with various metadata, such as authorship data, publisher data, file ownership, file permissions, security data, encryption data, a folder structure, or a storage location.

Accordingly, examples of the disclosure can facilitate conversion of a file stored in a content repository to other file formats that may be compatible with other types of devices, users, user groups, or conditions under which a file can be accessed. Upon receiving a request to access the file, examples of the disclosure can provide a copy of the file in an appropriate file format based upon properties associated with the request, properties of the device submitting the request, parameters embedded in the request, or network conditions associated with receipt of the request.

Figure 1:
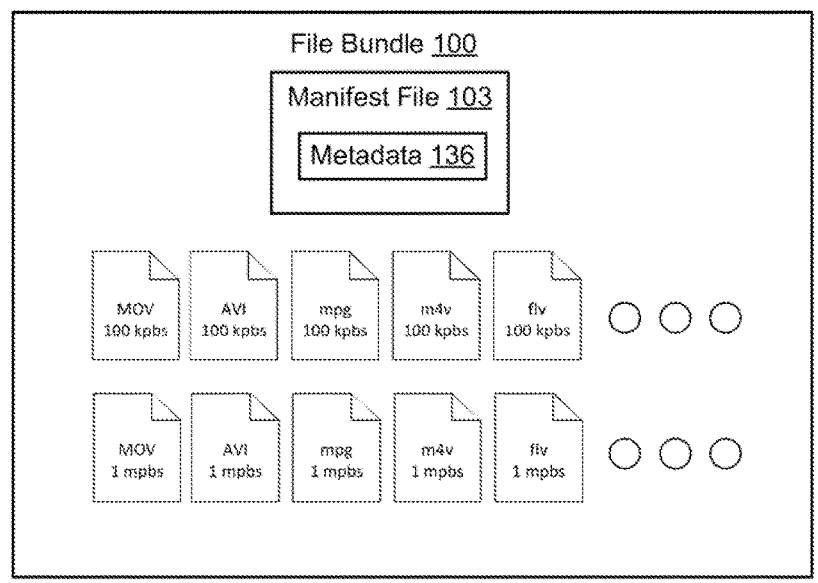
FIG. 1 is an example scenario according to one embodiment of the disclosure.

Therefore, examples of the disclosure facilitate creation of a file bundle 100 associated with a file stored in a content repository. As shown in FIG. 1, a file bundle 100 can be associated with a manifest file 103. The manifest file 103 can store metadata 136 associated with the file along with references to various copies of a file. The file can be stored in various formats that are compatible with various types of file viewers, user preferences, or other conditions under which the file may be accessed. In the example shown in FIG. 1, a video file can be stored in various formats and in some scenarios, multiple versions of the file can be stored in different formats. For example, a high bandwidth or high quality version of a file in a particular format can be stored along with a low bandwidth or low quality version of the file in the same format.

The file bundle 100 can be automatically generated and stored in a content repository or data store in response to storage of the file in one format. For example, an administrator or a user can author or upload a video to a content repository and associate the video with metadata 136. In response to uploading the file, examples of the disclosure can generate multiple versions of the file in various content formats to populate a file bundle 100 and associate the metadata 136 corresponding to the file with the manifest file 103. The manifest file 103 can also include a reference to a storage location of the various versions of the file.

Later, a client device can generate a request for a copy of a file corresponding to the file bundle 100. Examples of the disclosures can, based upon the parameters associated with the request, select an appropriate copy of the file in a particular format to provide to the client device. In this way, a user can select a piece of content, such as a reference or link to the file bundle, and examples of the disclosure can provide the content in an appropriate format. Examples of request parameters can include an operating system of the client device, a user account or a user group associated with the user, network conditions, network speed, a bandwidth allocation of a network connection, a remaining battery life of the client device, supported file types associated with the client device, an identity of viewer applications installed upon the client device, or other attributes that can be embedded in or otherwise associated with the request. A request parameter can also identify codecs for images, audio, or video files that are compatible with a client device. As another example, a request parameter can also include an identity of a file viewer that is installed upon the client device for viewing or editing certain file types.

Figure 2:
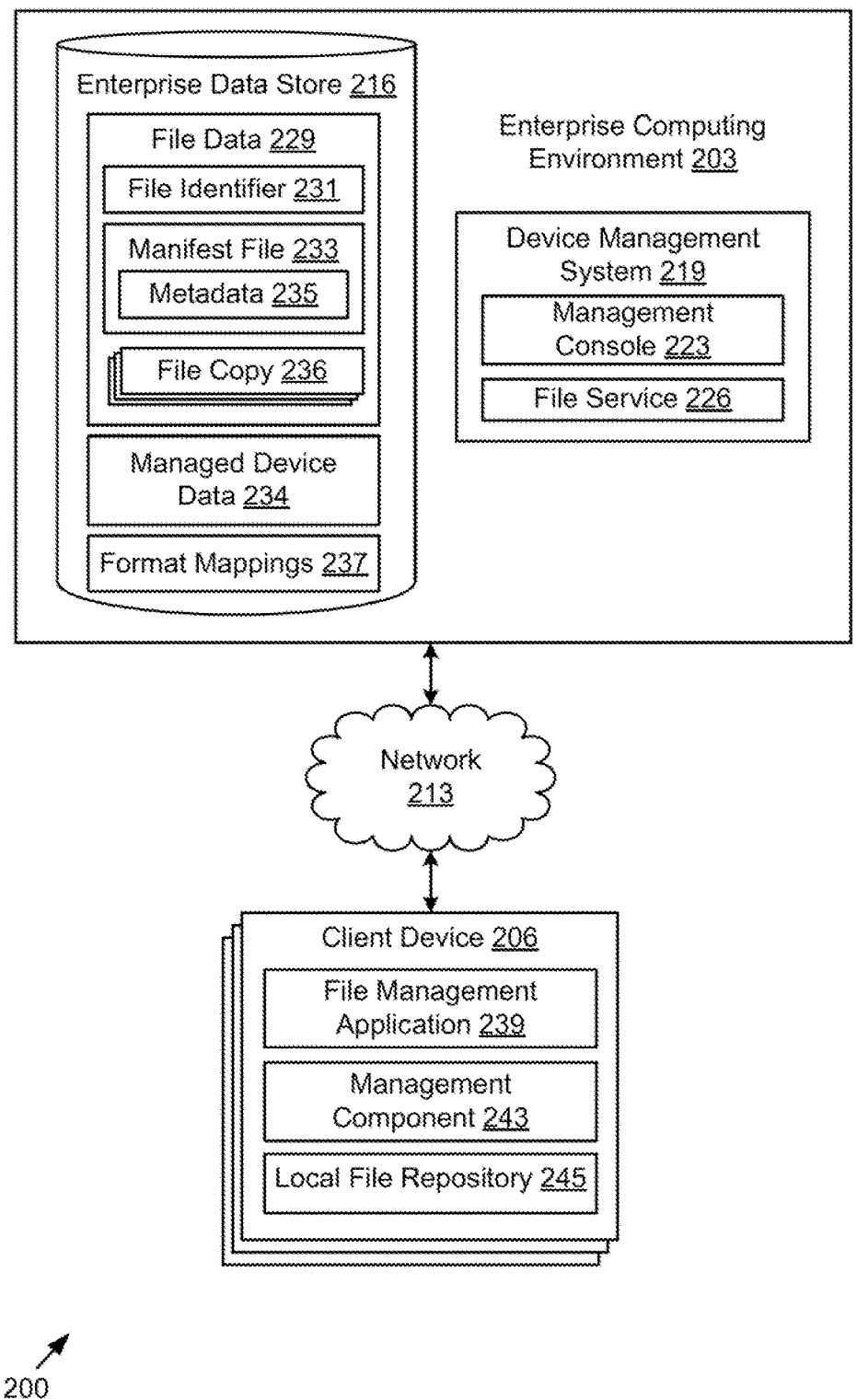
FIG. 2 is a drawing of a networked environment according to various embodiments.

With reference to FIG. 2, shown is a networked environment 200 according to various embodiments. The networked environment 200 shown in FIG. 1 includes an enterprise computing environment 203, a client device 206, and potentially other components, which are in data communication with each other over a network 213. The network 213 includes, for example, the Internet, one or more intranets, extranets, wide area networks (WANs), local area networks (LANs), wired networks, wireless networks, other suitable networks, or any combination of two or more such networks. Such networks may comprise satellite networks, cable networks, Ethernet networks, telephony networks, and/or other types of networks.

The enterprise computing environment 203 can include, for example, a server computer or any other system providing computing capabilities. Alternatively, the enterprise computing environment 203 can employ multiple computing devices that can be arranged, for example, in one or more server banks, computer banks, or other arrangements. The computing devices can be located in a single installation or can be distributed among many different geographical locations. For example, the enterprise computing environment 203 can include multiple computing devices that together form a hosted computing resource, a grid computing resource, and/or any other distributed computing arrangement. In some cases, the enterprise computing environment 203 can operate as at least a portion of an elastic computing resource where the allotted capacity of processing, network, storage, or other computing-related resources can vary over time. The enterprise computing environment 203 can also include or be operated as one or more virtualized computer instances that are executed to perform the functionality that is described herein. Generally, the enterprise computing environment 203 uses particular security protocols and is considered a trusted computing environment.

The enterprise data store 216 shown in FIG. 1 can be representative of multiple enterprise data stores 216. A device management system 219 and/or other systems can be executed in the enterprise computing environment 203. The device management system 219 can manage and/or oversee the operation of multiple client devices 206. In some embodiments, an enterprise, such as one or more companies or other organizations, can operate the device management system 219 to oversee and/or manage the operation of the client devices 206 of its employees, contractors, and customers. Accordingly, the device management system 219 is considered a trusted system.

The device management system 219 can include a management console 223, a file service 226, and/or other components. The management console 223 can facilitate administration of devices of an enterprise by administrators via the device management system 219. For example, the management console 223 can generate one or more user interfaces that are rendered on a display device to facilitate interaction with the device management system 219. The user interfaces can facilitate an administrator's inputting of commands or other information for the device management system 219. Additionally, the user interfaces can include presentations of statistics or other information regarding the client devices 206 that are managed by the device management system 219. A user can also upload a file to the enterprise data store 216, edit metadata associated with the file, and edit or access other user data corresponding to user accounts within an enterprise.

The file service 226 can obtain and store information regarding files that are associated with one or more client devices 206 and/or the device management system 219. The file service 226 can facilitate upload, download and/or synchronization of files between client devices 206 and the enterprise data store 216. For example, a client device 206 can request a file stored in the enterprise data store 216 and the file service 226 can authenticate the user's access to the requested file. The file service 226 can also select an appropriate version of the file in an appropriate content format to provide based on an analysis of request parameters or properties associated with the user.

The data stored in the enterprise data store 216 can include file data 229, managed device data 234, format mappings 237 and/or other information. The file data 229, in one example, can include an entry for each file stored by a user in the enterprise data store 216 via the file service 226. In some examples, an entry can include at least one file identifier 231, which can include a filename, a unique identifier associated with an entry, a file reference (i.e., a reference to a piece of content for which multiple copies are stored in the enterprise data store 216), or any other identifier or information with which a file or a set of files within the enterprise data store 216 can be identified. For example, a file identifier 231 can identify where a video, document, or other type of content is located, even though multiple copies of the content in various storage formats can be stored in the enterprise data store 216.

An entry in the file data 229 can also include a manifest file 233. A manifest file 233 can include metadata 235 associated with a set of files stored in the enterprise data store 216 that is associated with a file identifier 231. For example, metadata 235 can comprise authorship information, user accounts associated with or authorized to access files associated with an entry in the file data 229, access history, revision history, or any other metadata 235 that may be relevant to a piece of content. The manifest file 233 can also include a reference to the copies of the file that are stored in the enterprise data store 216 in various content formats. In this way, the manifest file 233 can facilitate selection of an appropriate file in a particular content format that is appropriate for a client device 206 from which the file is accessed.

In one embodiment, each entry associated with a piece of content is also associated with various file copies 236. A file copy 236 comprises a version or copy of a file in a particular format. For example, a media file can be encoded in various formats. Accordingly, a file copy 236 can comprise a copy of a file encoded in a specific format. In the case of a video, a file copy 236 associated with a video can be encoded using a video codec. As another example, a file copy 236 associated with an audio file can be encoded using a particular audio encoding standard. As another example, a file copy 236 associated with a document can be encoded using a particular open or proprietary document encoding format. The manifest file 233 can identify the storage location within the enterprise data store 216 of the various file copies 236.

The managed device data 234 can include information regarding the client devices 206 that are managed and/or controlled by the device management system 219. The managed device data 234 for a client device 206 can include, for example, the identification of a user assigned to the client device 206, identification of one or more user groups to whom a particular user or client device 206 is assigned, the identification of applications that are installed in the client device 206, the identification of files that are synchronized between the client device 206 and the file service 226, and historical data regarding the operation of the client device 206.

Format mappings 237 can include data that facilitates conversion of a file stored in the enterprise data store 216 to various other formats that can be stored as file copies 236. For example, the format mappings 237 can specify that a file type should be converted into specified formats and stored in the enterprise data store as file copies 236. For example, if a document encoded in a particular format is uploaded to the file service 226, the file service 226 can consult the format mappings 237, to determine that the file should be converted into a number of other document formats that are stored as file copies 236. For example, the format mappings 237 can specify that a document encoded in a format such as a MICROSOFT WORD document or a PORTABLE DOCUMENT FORMAT document should be converted and stored in different document formats by the file service 226 in the enterprise data store 216. These different document formats can be formats other than a format in which the document was uploaded to the file service 226, such as a plain text file as well as other open or proprietary document formats.

As another example, the format mappings 237 can specify that a video encoded in a format such as one of various moving picture experts group (MPEG) video formats should be converted and stored in different video formats of different qualities or bitrates by the file service 226. For example, the format mappings 237 can specify that a video encoded in an MPEG-4 format should be converted into MPEG-1, MPEG-2, Motion JPEG, and other open or proprietary video formats. The format mappings 237 can also specify that the video should be converted and stored in multiple bitrate versions for each of the different video formats identified by a format mapping 237, including varying bitrate versions of the same format in which the video was provided to the file service 226.

As another example, the format mappings 237 can specify that an audio file encoded in a format such as a Waveform Audio File Format (WAV) should be converted and stored in different audio formats of different qualities or bitrates by the file service 226. For example, the format mappings 237 can specify that a video encoded in a WAV format should be converted into Audio Interchange File Format (AIFF), Free Lossless Audio Codec (FLAC), MPEG Audio Layer III (MP3), and other open or proprietary audio formats. The format mappings 237 can also specify that the audio file should be converted and stored in multiple bitrate versions for each of the different audio formats identified by a format mapping 237, including varying bitrate versions of the same format in which the audio file was provided to the file service 226.

Additionally, the format mappings 237 can also specify which format of a requested file, or a requested file identifier 231, should be provided to a client device 206 by the file service 226 based upon the properties of a request for particular content or other conditions associated with the request. For example, format mappings 237 can specify that a particular document format, audio format, video format or other content format, should be provided to a client device 206 based upon an operating system parameter associated with the client device 206. As another example, the format mappings 237 can specify that a particular format and a particular version of the file stored as a file copy 236 in the format should be provided to a client device 206 based upon a parameter provided by the client device 206 in a request for content. Exemplary parameters can include a parameter with respect to network speed, network conditions, a display size or display resolution of the client device 206, or other parameters that can be included in a request to retrieve a particular file.

The client device 206 is representative of multiple client devices 206 that may be coupled to the network 213. The client device 206 can comprise, for example, a processor-based system such as a computer system. Such a computer system can be embodied in the form of a desktop computer, a laptop computer, a personal digital assistant, a mobile phone (e.g., a "smartphone"), a set-top box, a music player, a web pad, a tablet computer system, a game console, an electronic book reader, or any other device with like capability. The client device 206 can include a display as well as one or more input devices, such as a mouse, touch pad, etc., that facilitates a user input or other types of data input into the client device 206.

The client device 206 can be configured to execute a file management application 239 and a management component 243, as well as other components. The file management application 239 can include, for example, one or more programs that access, manage, edit, and/or perform other functions with respect to files. As examples, a file can include an image, a video, an audio file, a word processing document, a spreadsheet, a presentation file, or a PDF file. In some embodiments, the file management application 239 can be regarded as being part of a "content locker," because the file management application 239 can restrict access to one or more of the files. The file management application 239 can render files, such as images, documents, or videos. In addition, one or more user interfaces for the file management application 239 can facilitate a user editing the content of a file, such as a word processing document, spreadsheet, or image. In addition, one or more user interfaces for the file management application 239 can facilitate a user causing a file to be provided to other client devices 206, the device management system 219, or other systems.

In one example of the disclosure, the file management application 239 can render a user interface in which a user may browse files associated with a user account. The file management application 239 can retrieve the manifest file 233 or metadata 235 associated with a file identifier 231, which can include additional information about the content associated with the file identifier 231. For instance, the additional information can include a document preview or a thumbnail image. Upon selection of a particular file or content for viewing and/or download, the file management application 239 can generate a request to retrieve the content from the file service 226. In response to receiving the request to retrieve the content, the file service 226 can identify the appropriate file copy 236 to provide to the client device 206 based upon the request and the format mappings 237. In one example, the file management application 239 can include information about the client device 206, such as an operating system, supported file formats, network conditions, network connection speed, or other parameters from which the file service 226 can identify an appropriate format associated with a file identifier 231.

The management component 243 can monitor and/or manage at least a portion of the data, applications and hardware components for the client device 206. The management component 243 can also identify whether the client device 206 is operating in accordance with the one or more compliance rules that are associated with one or more device profiles that have been assigned to the client device 206. In some embodiments, the management component 243 can function as a device management service that operates as a portion of an operating system for the client device 206. In other embodiments, the management component 243 can function as a device management agent that operates in the application layer of the client device 206 and that monitors at least some of the activity being performed in the client device 206. In other embodiments, the management component 243 can include an application wrapper that interfaces with a software component to facilitate overseeing, monitoring, and/or managing one or more resources of the client device 206. Alternatively, the management component 243 may be a portion of an application that was developed, for example, using a Software Development Kit (SDK) that facilitates the inclusion of functionality within the application that monitors and/or manages at least a portion of the resources for the client device 206.

The client device 206 can execute the management component 243 automatically upon startup. Additionally, the management component 243 can run as a background process in the client device 206. Accordingly, the management component 243 can, in some examples, execute without user intervention. Additionally, the management component 243 can communicate with the device management system 219 to facilitate the device management system 219 managing the client device 206. For example, the management component 243 can obtain compliance rules from the device management system 219, and the management component 243 can determine whether the client device 206 is operating in accordance with those compliance rules. In another example, the management component 243 transmits data that indicates the status of settings for the client device 206, and the device management system 219 uses this data to determine whether the client device 206 is operating in accordance with compliance rules.

For example, a compliance rule can specify in order to access user data such as email, files in the local file repository 245, contacts, or calendar data that a client device 206 must execute specific applications. As another example, a compliance rule can specify a client device 206 must access user data from a particular geographic location or while connected to a particular network. A compliance rule can also specify certain time windows that identify a particular day, week, month or year during which a client device 206 is authorized to access user data.

Another example of a compliance rule can include a requirement that an operating system of the client device 206 be unmodified with respect to root access or superuser privileges available to the user. For example, certain mobile devices and/or mobile devices can be shipped with restrictions or limitations regarding root access or superuser privileges of an operating system. In other words, such access may be unavailable to the user. However, certain users can employ exploits related to software and/or hardware of the client device 206 in order to gain root access or superuser privileges on the client device 206. Accordingly, a compliance rule can require that such a restriction or limitation on root access or superuser privileges remain in place with respect to a client device 206 in order for the client device 206 to access user data. The management component 243 can determine whether such a restriction or limitation has been removed by attempting to perform one or more actions for which root access or superuser privileges are required. If the management component 243 can perform such an action, it can determine that the restriction or limitation has been removed.

A compliance rule can specify that the client device 206 employ a certain encryption protocol or procedure. For example, a compliance rule can specify that the client device 206 employ data at rest encryption for certain data stored on the client device 206. As another example, a compliance rule can specify that the management component 243 and/or an application executed by the client device should periodically communicate with or "ping" the device management system 219 within a specified amount of time relative to a previous communication or ping. In other words, the compliance rule can specify that the management component 243 periodically "check in" with the device management system 219 or another server process.

Another compliance rule can specify that certain applications are not permitted to be installed on a client device 206 in order for the client device 206 to access user data. For example, certain applications can be designated as malicious applications or unauthorized applications. Accordingly, if the management component 243 detects such an application installed on the client device 206, a compliance rule can specify that such a client device 206 is not permitted to access user data or that another action should be taken. Alternatively, a compliance rule can also require installation of one or more applications on the client device 206 in order for the client device 206 to access user data. For example, certain applications can be identified as required applications by an administrator. Accordingly, if such an application is not installed on the client device 206, a compliance rule can specify that the client device 206 is not permitted to access user data or that another action should be taken.

A compliance rule can also specify that if certain types of data are detected to be resident on the client device 206 or in storage accessible to the client device 206, that a security command is issued to the client device 206. For example, certain data can be identified as unauthorized data. Accordingly, if such data is detected to be stored on the client device 206, a compliance rule can specify that such a client device 206 is not permitted to access user data or that another action is taken. Such unauthorized data can include, for example, music, videos, games, unencrypted data, secure documents, or any other data stored on the client device 206. A compliance rule can specify that a certain action be taken when the client device 206 is associated with a new subscriber identity module (SIM) card relative to a previous SIM card.

A compliance rule can also specify parameters with respect to password complexity, and if a password corresponding to a user fails to possess a minimum password complexity, the compliance rule can specify that a certain action be taken. Another compliance rule can relate to a maximum number of failed login and/or unlock code entry attempts, and if the management component 243 detects that this number of attempts has been exceeded, the compliance rule can specify that a certain action be taken.

Additionally, a compliance rule can be triggered depending on the location of the client device 206. For example, certain compliance rules can be triggered when the location of the client device 206 is detected to be within or outside of a certain geographic area or when the client device 206 is connected to a particular network 109. In such a scenario, the management component 243 can take an action specified by the compliance rule when the rule is violated and when a property regarding the location of the client device 206 can be detected. A location property can be detected via a global positioning system (GPS) or other location detection capability of the client device 206.

Compliance with rules can be determined by the management component 243, the device management system 219, a combination of the management component 243 and the device management system 219, or another process that is executed on another computing device. For example, the file management application 239 can submit a request to the file service 226 requesting a determination of whether the client device 206 is in compliance with compliance rules. The file service 226 can make such a determination by querying the device management system 219 and issue a response to the file management application 239. Additionally, compliance can be determined by a combination of the management component 243, file service 226 and device management system 219. For example, compliance with some compliance rules can be determined locally on the client device 206 by the management component 243, while others can require or can be more efficiently determined by the device management system 219.

As referenced above, compliance rules can specify actions that the management component 243 can take in response to a determination that a client device 206 that is not in compliance with a compliance rule. As one example, the management component 243 can erase certain user data from the client device 206, such as email, files stored in the local file repository 245, or calendar data stored on the client device 206. In one example, the management component 243 can specify that all user data or that only certain user data be removed from the client device 206. As another example, the management component 243 can lock a display of the client device 206 so that a password and/or personal identification number (PIN) code must be reentered by the user in order to access user data stored on the client device 206.

The management component 243 can also reverse an action taken with respect to a client device 206 in response to detecting violation of a compliance rule if the client device 206 later becomes compliant with the compliance rule. For example, an action such as locking the display of the client device 206 can later unlock the display of the client device 206 in response to the client device 206 later becoming compliant with compliance rules. In some examples, an action taken in response to violation of a compliance rule can include a warning or alert that is displayed by or transmitted to the client device 206. For example, the device management system 219 can transmit a warning message indicating that one or more client devices 206 of a user are out of compliance, such as a push notification, email message or text message. Such a warning can comprise a visual indicator that is rendered by the management component 243 or any other application executed by the client device 206. Such a warning can also identify an action that can be taken with respect to client devices 206 of the user should the violation of the compliance rule not be remediated within a specified period of time.

If it is determined that the client device 206 is not in compliance with one or more compliance rules, the management component 243 or the device management system 219 causes a remedial action to be performed. Examples of remedial actions include notifying a user of the device or an administrator of the device management system 219, causing device settings to be changed so that the client device 206 becomes compliant with the compliance rules, and erasing data in the client device 206. The local file repository 245 can include one or more files obtained and/or synchronized by the file management application 239 from the file service 226.

Next, a description of additional examples of the operation of the various components in the networked environment 200 is provided. As noted above, the file service 226 can facilitate retrieval of content from the enterprise data store 216 on behalf of users having access to content that is stored therein. Accordingly, in one example, a client device 206 assigned to a particular user can be enrolled within a device management system 219 or any other service that facilitates synchronization of files between the client device 206 and the file service 226.

In one scenario, a user can upload a file or other type of content for storage, publication or distribution to other users to the file service 226, which can store the uploaded file as a file copy 236 in the enterprise data store 216. Additionally, the file service 226 can consult the format mappings 237 to determine other file formats to which the uploaded file should be converted and also stored as file copies 236. The file service 226 can associate the uploaded file with a file identifier 231, which is an identifier by which the file and/or content associated with the file can be located or identified.

The file service 226 can generate a manifest file 233 that specifies a storage location of the file copies 236 and metadata 235 associated with the content. In this way, the content can be stored in the formats specified by the format mappings 237, but the metadata 235 need not, in one example, be replicated with every instance of a file copy 236 stored by the file service 226 in the enterprise data store 216. In this way, a file bundle is logically represented by the file copies 236, the manifest file 233, the metadata 235 and the file identifier 231 generated by the file service 226 and stored in the enterprise data store 216.

In some scenarios, rather than being uploaded by a user via a client device 206, a particular file can also be uploaded by an administrator using the management console 223 along with metadata 235. In response to receiving a file in this way, the file service 226 can again consult the format mappings 237 to generate file copies 236 in the appropriate formats. As described above, the file service 226 can also generate a manifest file 233 for the file.

In another scenario, the file service 226 can also suppress visibility of a file identifier 231 such that a user browsing content cannot see the file identifier 231 in a user interface generated by the file management application 239 until a file copy 236 that is compatible with the client device 206 is generated and stored as a file copy 236. In this scenario, compatibility with the client device 206 can be determined by the file service 226 and/or the file management application 239. For example, an operating system, an identity of a particular file viewer installed upon the client device 206, or other properties of the client device 206 can be used to determine compatibility.

In one example, a file can be associated with a user group or a user upon being uploaded to the enterprise data store 216 via the file service 226. For example, a user can belong to a user group that is associated with a geographic location, a group within an enterprise (e.g., a sales team user group), a class of users (e.g., temporary employees or permanent employees), or any other grouping of users. In response to a file being associated with a user account or a user group to which a user belongs, the file service 226 and/or file management application 239 can initiate synchronization of the appropriate file copy 236 in a format compatible with the client device 206 to be stored upon the client device 206 in a local file repository 245. In one scenario, the file service 226 can transmit a notification to the file management application 239 that identifies the file identifier 231 corresponding to a file associated with a user account or a user group associated with the client device 206. In response to the notification, the file service 226 can transmit a file copy 236 in a compatible format to the file management application 239, or the file management application 239 can initiate a request for the file identifier 231 and receive a compatible file copy 236.

Figure 3:
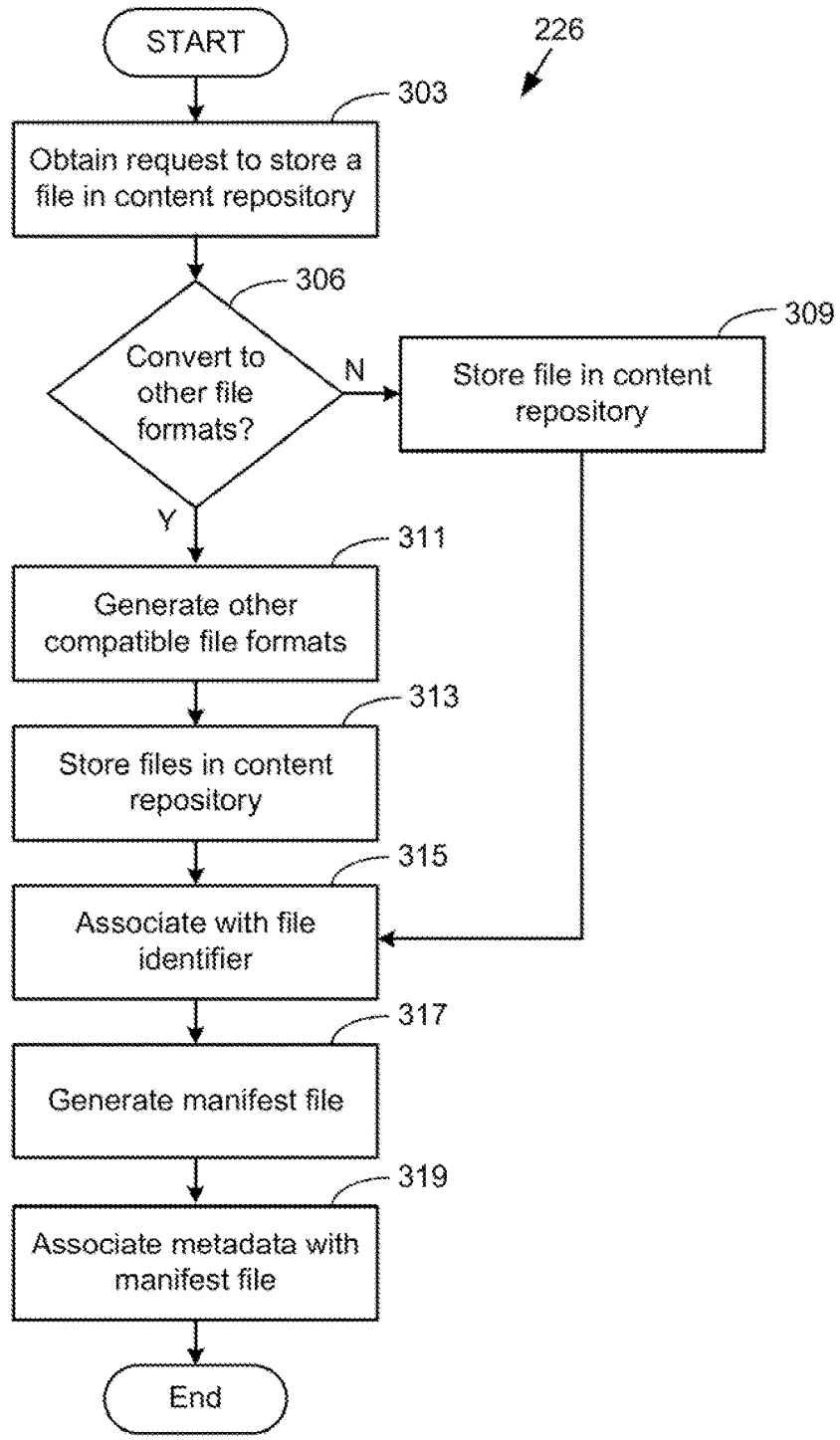
FIG. 3 is a flowchart illustrating an example of functionality implemented by a file service according to various embodiments.

With reference to FIG. 3, shown is a flowchart that provides an example of a portion of the operation of the file service 226 according to various embodiments. In particular, FIG. 3 provides an example of the file service 226 storing a file and corresponding file copies 236 in the enterprise data store 216. The flowchart of FIG. 3 provides merely an example of the many different types of functional arrangements that can be employed to implement the file service 226.

Beginning with element 303, the file service 226 obtains a request to store a file copy 236 in a content repository or enterprise data store 216. In some embodiments, the request can be initiated by a user of the client device 206 requesting to save or upload a file copy 236. At box 306, the file service 226 can determine, based upon an analysis of the file copy 236 and the format mappings 237, whether the file copy 236 should be stored in other file formats as file copies 236. In other words, the file service 226 determines whether the file copy 236 provided to the file service 226 should be converted to other file formats.

If no other file formats are defined by the format mappings 237, the process proceeds to box 309 at which the file copy 236 is stored in the enterprise data store 216. Otherwise, the process proceeds to box 311, where the file service 226 generates other copies of the file copy 236 in the formats specified by the format mappings 237. Next, at box 313, the file service 226 can store the received file copy 236 and the files copies 236 generated in other formats in the enterprise data store 216. At box 315, the file copies 236 are associated with a file identifier 231. Next, at box 317, a manifest file 233 corresponding to the file identifier 231 is generated that identifies the various formats in which file copies 236 are stored. At box 319, metadata associated with the file copy 236 is stored in the manifest file 233. Thereafter, the process proceeds to completion.

Figure 4:
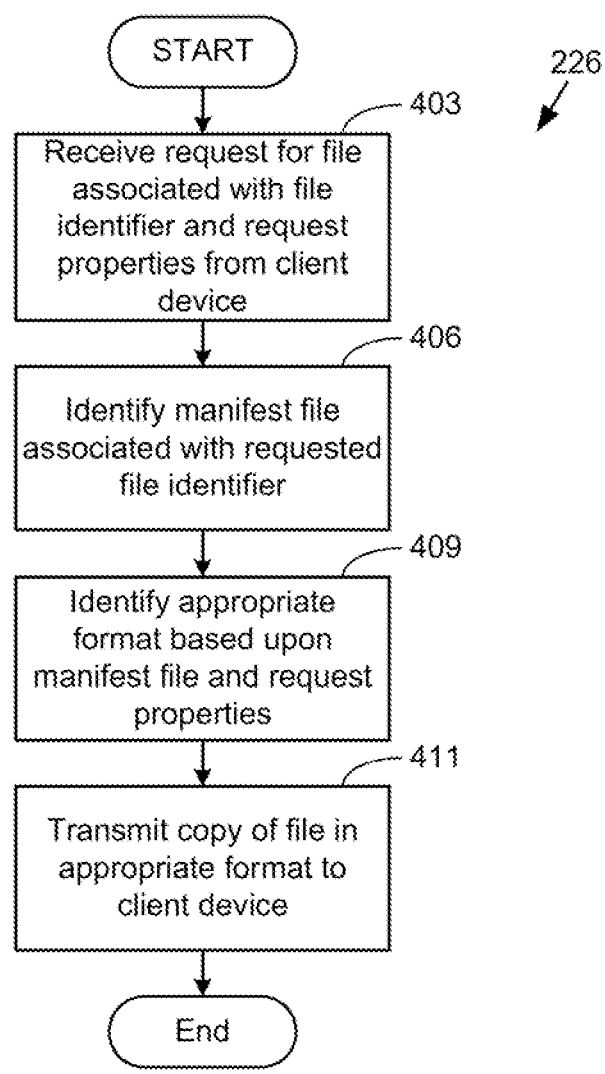
FIG. 4 is a flowchart illustrating an example of functionality implemented by a file service according to various embodiments.

With reference to FIG. 4, shown is a flowchart that provides an example of a portion of the operation of the file service 226 according to various embodiments. In particular, FIG. 4 provides an example of the file service 226 providing a copy of a file to a client device 206. It is understood that the flowchart of FIG. 4 provides merely an example of the many different types of functional arrangements that can be employed to implement the file service 226. As an alternative, the flowchart of FIG. 3 can be viewed as depicting an example of elements of a method implemented in the enterprise computing environment 203 (FIG. 1) according to one or more embodiments.

Beginning at box 403, the file service 226 receives a request for a file identifier 231 on behalf of or from a client device 206. The request can take the form of a request for a piece of content for which various file copies 236 are stored in the enterprise data store 216. Next, at box 406, the file service 226 can identify a manifest file 233 corresponding to the requested file identifier 231. At box 409, the file service 226 can identify a file copy in an appropriate file format from the format mappings 237 in the enterprise data store 216 by determining whether the format mappings 237 specify a particular file format that is associated with the client device 206 or the request parameters. Next, at box 411, the file service transmits a copy of the file in the appropriate file format to the client device 206. Thereafter, the process ends.

Figure 5:
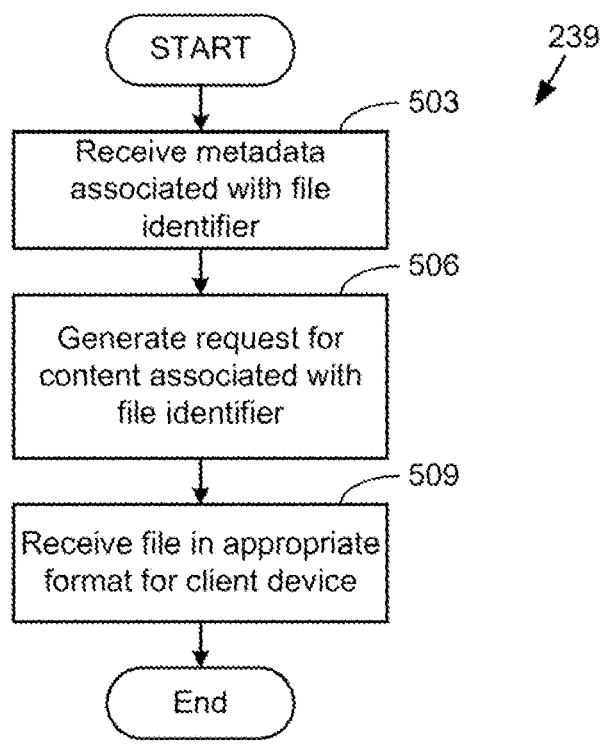
FIG. 5 is a flowchart illustrating an example of functionality implemented by the file management application according to various embodiments.

With reference to FIG. 5, shown is a flowchart that provides an example of a portion of the operation of the file management application 239 according to various embodiments. In particular, FIG. 5 provides an example of the file management application 239 obtaining a file associated with a file identifier from the file service 226 The flowchart of FIG. 5 provides merely an example of the many different types of functional arrangements that can be employed to implement the file management application 239. As an alternative, the flowchart of FIG. 5 can be viewed as depicting an example of elements of a method implemented in the client device 206 (FIG. 1) according to one or more embodiments.

Beginning at box 503, the file management application 239 causes the client device 206 to obtain metadata associated with a file identifier 231. The file management application 239, in one example, can generate a user interface that facilitates browsing of files by a user before initiating download of the file. At box 506, the file management application 239 generates a request for content associated with the file identifier 231. At box 509, the file management application can receive a file copy 236 that is compatible with the client device 206 and/or the parameters embedded within such a request. If a file copy 236 that is compatible with the client device 206 does not exist, a compatible file copy 236 can be generated for the requesting client device 206 or a message returned to the client device 206 indicating that the requested file is unavailable. Thereafter, the process ends.

The flowcharts of FIGS. 3-5 show examples of the functionality and operation of implementations of components described herein. The components described herein can be embodied in hardware, software, or a combination of hardware and software. If embodied in software, each element can represent a module of code or a portion of code that comprises program instructions to implement the specified logical function(s). The program instructions can be embodied in the form of, for example, source code that comprises human-readable statements written in a programming language and/or machine code that comprises machine instructions recognizable by a suitable execution system, such as a processor in a computer system or other system. If embodied in hardware, each element can represent a circuit or a number of interconnected circuits that implement the specified logical function(s).

Although the flowcharts show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some embodiments, one or more of the elements shown in the flowcharts can be skipped or omitted.

The enterprise computing environment 203, the client device 206 and/or other components described herein can each include at least one processing circuit. Such a processing circuit can comprise, for example, one or more processors and one or more storage devices that are coupled to a local interface. The local interface can comprise, for example, a data bus with an accompanying address/control bus or any other suitable bus structure.

The one or more storage devices for a processing circuit can store data and/or components that are executable by the one or more processors of the processing circuit. For example, the device management system 219, the file management application 239, and/or other components can be stored in one or more storage devices and be executable by one or more processors. Also, a data store, such as the enterprise data store 216 can be stored in the one or more storage devices.

The device management system 219, the file management application 239 and/or other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology can include, for example but is not limited to, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs) and complex programmable logic devices (CPLDs)).

Also, one or more or more of the components described herein that comprise software or program instructions can be embodied in any non-transitory computer-readable medium for use by or in connection with an instruction execution system such as, for example, a processor in a computer system or other system. The computer-readable medium can contain, store, and/or maintain the software or program instructions for use by or in connection with the instruction execution system.

A computer-readable medium can comprise a physical media, such as, magnetic, optical, semiconductor, and/or other suitable media. Examples of a suitable computer-readable media include, solid-state drives, magnetic drives, and flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described embodiments of the present disclosure are merely examples of implementations to set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A method, comprising:
    receiving, at a file service, a request to store a file copy in a content repository, the file copy being associated with a particular file format and file metadata;
    generating, at the file service, a plurality of copies in a plurality of file formats based upon the file copy;
    generating, at the file service, a manifest file associated with the file copy and the plurality of copies, the manifest file comprising the file metadata and references to the file copy and the plurality of copies;
    associating, by the file service, the manifest file, the file copy, and the plurality of copies with a file identifier, wherein the file copy and the plurality of copies are associated with a plurality of client device parameters;
    receiving, from a client device, a request for a compatible file copy corresponding to the file identifier;
    identifying the compatible file copy based upon a request parameter associated with the request; and
    transmitting the compatible file copy corresponding to the file identifier to the client device.

2. The method of claim 1, wherein the request parameter comprises a bandwidth allocation of the client device, a network speed parameter, or a battery life parameter associated with the client device.

3. The method of claim 1, further comprising generating, in the file service, a response that the file identifier is unavailable in response to a compatible one of the plurality of copies for the client device being unavailable in the content repository.

4. The method of claim 1, further comprising:
    identifying, based at least in part upon the request parameter, an operating system of the client device; and
    selecting, in the file service, the compatible file copy based at least in part upon the operating system of the client device.

5. The method of claim 1, further comprising transmitting, in response to the request for the file identifier, the file metadata associated with the file identifier to the client device.

6. The method of claim 1, wherein the file copy comprises a video file or an audio file and generating the plurality of copies of the file copy in the plurality of file formats comprises converting, in the file service, the video file or the audio file into the plurality of file formats.

7. The method of claim 1, further comprising associating, in the file service, the file identifier with a user group.

8. A system, comprising:
    at least one computing device;
    a file service executed by the at least one computing device, the file service configured to cause the at least one computing device to at least:
        obtain a request to store a file copy in a content repository, the file copy being associated with a particular file format and file metadata;
        generate a plurality of copies of the file copy in a plurality of file formats;
        generate a manifest file associated with the file copy and the plurality of copies of the file copy, the manifest file comprising the file metadata and references to the file copy and the plurality of copies of the file copy;
        associate the manifest file, the file copy, and the plurality of copies of the file copy with a file identifier, wherein the file copy and the plurality of copies are associated with a plurality of client device parameters;
        receive a request for a compatible file copy corresponding to the file identifier from a client device;
        identify the compatible file copy based upon a request parameter associated with the request; and
        transmit the compatible file copy corresponding to the file identifier to the client device.

9. The system of claim 8, wherein the request parameter comprises at least one of an operating system executed by the client device, a bandwidth allocation of the client device, a network speed parameter, or a battery life parameter.

10. The system of claim 8, wherein the request parameter comprises a codec or a file viewer associated with the client device and the one of the plurality of file formats is compatible with the codec or the file viewer.

11. The system of claim 8, wherein the file copy comprises a video file or an audio file and the plurality of copies of the file copy in the plurality of file formats are generated by converting the video file or the audio file into the plurality of file formats.

12. The system of claim 11, wherein the plurality of file formats comprises a plurality of bitrates corresponding to one of the plurality of file formats.

13. A non-transitory computer-readable medium embodying program instructions executable in a computing device, the program instructions being configured to cause the computing device to at least:
    receive, in the computing device, a request to access a particular file from a client device;
    identify, in the computing device, a manifest file associated with the particular file stored in a content repository;
    identify, by the computing device, a plurality of copies of the file in a plurality of file formats defined by the manifest file;
    identify, by the computing device, one of the plurality of file formats appropriate for the client device from the manifest file;
    transmit, from the computing device, a particular copy of the file corresponding to the one of the plurality of file formats to the client device;
    receive, from a client device, a request for the particular file;
    identify, by the computing device, a compatible file copy from the plurality of copies of the file based upon a request parameter associated with the request; and transmit, to the client device, the compatible file copy corresponding to the file identifier.

14. The non-transitory computer-readable medium of claim 13, the program being further configured cause the computing device to at least:
- extract, from the manifest file, metadata associated with the particular file; and
- transmit, from the computing device, the metadata associated with the particular file to the client device.

15. The non-transitory computer-readable medium of claim 13, wherein the request parameter comprises a codec or a file viewer associated with the client device and the one of the plurality of file formats is compatible with the codec or the file viewer.

16. The non-transitory computer-readable medium of claim 13, wherein the request parameter comprises at least one of an operating system, a network status, or a connection speed associated with the client device.

* * * * *